Nov. 4, 1924. 1,514,302
W. C. NASON
SLEIGH ATTACHMENT FOR MOTOR VEHICLES
Filed March 27 1923 3 Sheets-Sheet 1
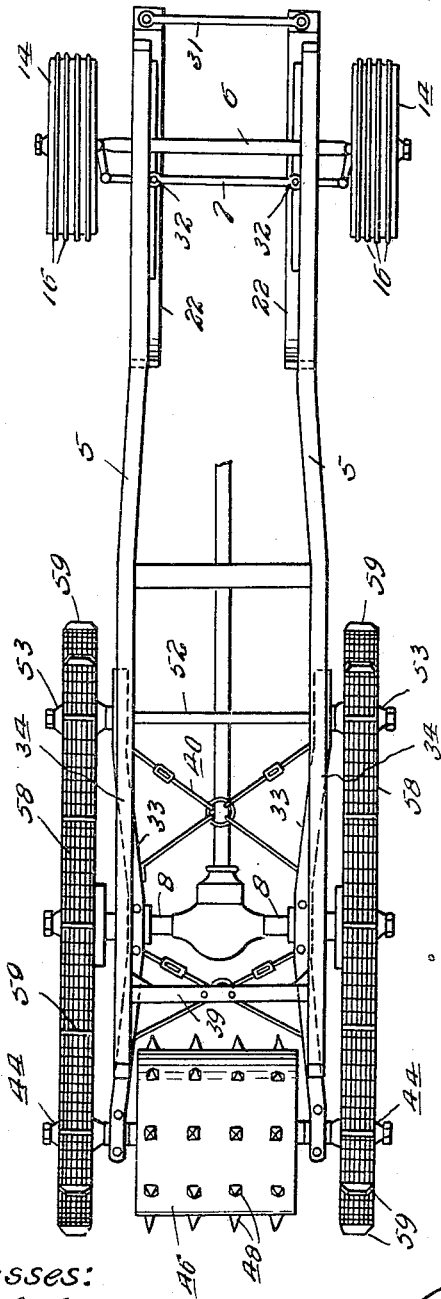

Nov. 4, 1924.                                                    1,514,302
                        W. C. NASON
            SLEIGH ATTACHMENT FOR MOTOR VEHICLES
              Filed March 27, 1923      3 Sheets-Sheet 2
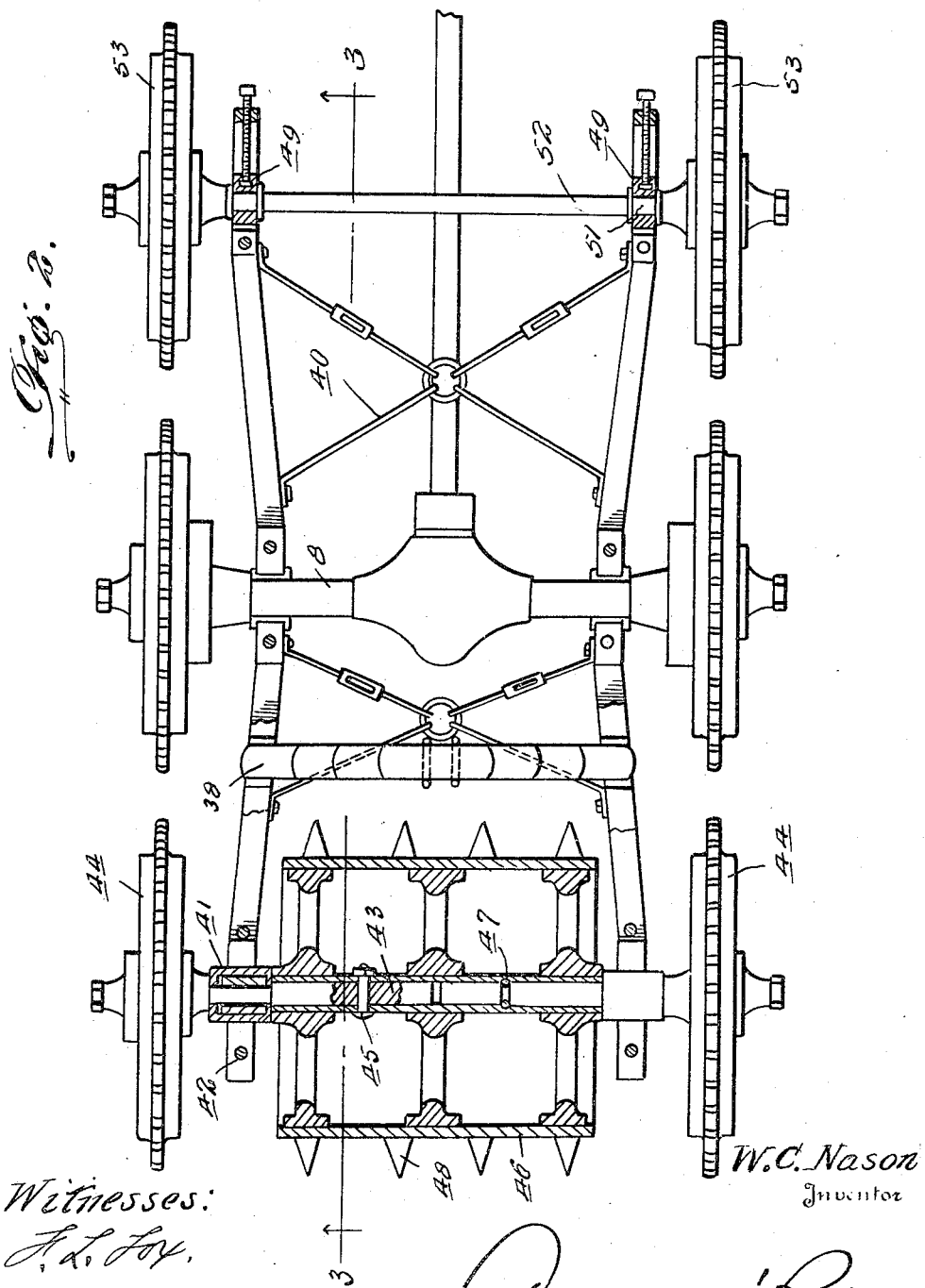

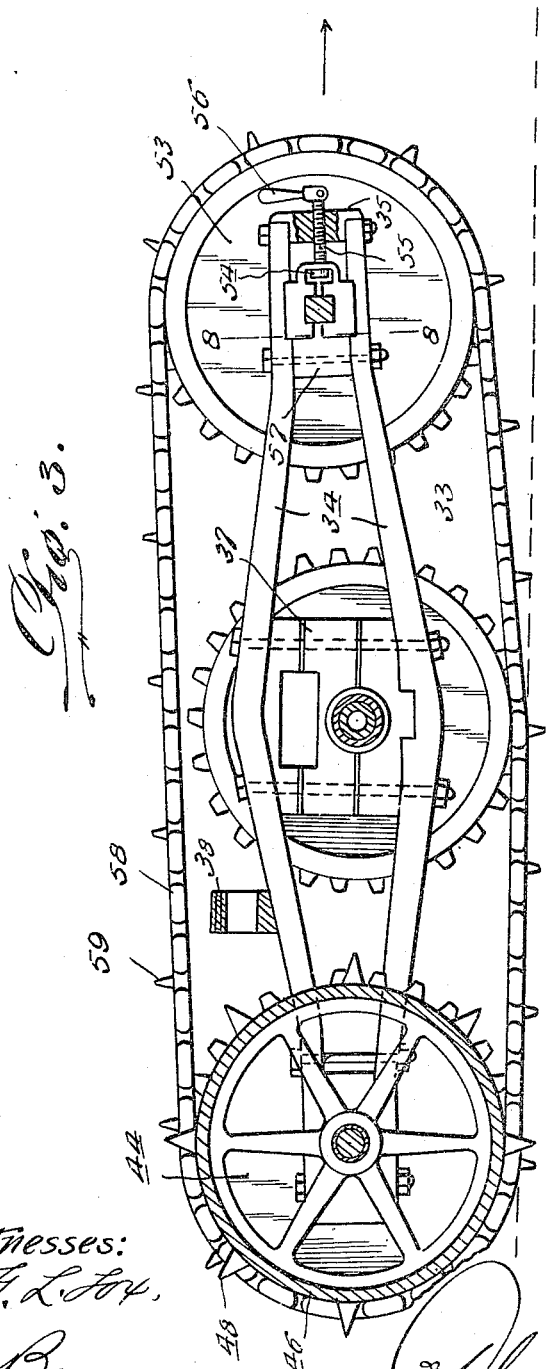

Patented Nov. 4, 1924.

1,514,302

UNITED STATES PATENT OFFICE.

WILLIAM CHESTER NASON, OF WATERBORO, MAINE.

SLEIGH ATTACHMENT FOR MOTOR VEHICLES.

Application filed March 27, 1923. Serial No. 627,977.

*To all whom it may concern:*

Be it known that I, WILLIAM C. NASON, a citizen of the United States, residing at Waterboro, in the county of York and State of Maine, have invented certain new and useful Improvements in Sleigh Attachments for Motor Vehicles, of which the following is a specification.

My invention relates to improvement in motor vehicle sleigh attachments, the main purpose thereof being the provision of such a device that constitutes a pair of runners and a pair of wide face wheels for the forward part of the vehicle, as well as a track device for the rear of the vehicle, these parts being so characterized as to be expeditiously applied to the vehicle without materially altering the construction thereof.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein :—

Figure 1 is a plan view of a motor vehicle frame equipped with my improved sleight attachment.

Figure 2 is an enlarged detail horizontal sectional view through the traction member of my sleigh attachment, the same being positioned relatively to the vehicle as shown.

Figure 3 is a detail longitudinal cross sectional view taken upon the line 3—3 of Figure 2, and looking in the direction of the arrows.

Referring to the drawings in detail, 5 designates the usual vehicle chassis bars, 6 the front axle, 7 the connecting rod of the vehicle stearing mechanism, and 8 the machine rear axle, it being understood that these elements are all of well-known types found upon all models of motor vehicles.

Pivotally secured adjacent the front ends of the vehicle chassis bars 5 are sleigh runners 22.

The front ends of the runners 22 are rigidly connected together, through the medium of a cross rod 31 while each of the runners have pivotal connection at 32 to the said connecting rod 7 of the vehicle steering mechanism, whereby the said runners 22 are simultaneously moved to a steering position with the front steering wheels 9.

The traction device more clearly shown in Figures 1, 2 and 3 comprise a pair of longitudinally extending side frame members 33. Each of these frame members constitutes a pair of vertically spaced bars 34 connected at their front ends by a spacing block 35, and at their rear ends by a spacing block 36. The central portion of these bars 34 are separated a considerably greater distance apart than the remaining portion thereof, and substantially intermediate the ends thereof are spacing and bearing blocks 37, each of the same comprising three or more sections, bolted or otherwise secured between the bars. The said side frame members 33 of the traction device are interconnected by a cross leaf spring 38, the same adapted to be secured to the usual cross bar 39 between the chassis bars 5 and adjacent the rear ends thereof, Figure 1.

The said side elements 33 are further connected through the medium of cross rods 40.

The said spacing blocks 36 between the rear ends of the bars 34 constituting the side members 33 are formed with openings for the reception of bearing elements 41 and engaging through these bearings are the reduced ends 42 of a two-piece axle 43, it being understood that the outer ends of this two-piece axle has keyed thereto sprocket wheels 44, the same consisting of ordinary vehicle wheels built up in a manner attributed to the rear track wheels of the motor vehicle. Keyed to one of the axle sections as at 45 is a track drum 46, the other axle section being so secured at 47 to this drum as to permit the same to rotate thereover, for differential purposes. This drum 46 is provided with a desirable number of traction spurs 48, and is adapted to be rotated in a manner hereinafter described.

Between the front ends of the bars 34 constituting the side elements 33 of the track are slidable bearing blocks 49. Each of these bearing blocks are formed with squared openings for the reception of the squared portions 51 adjacent the outer ends of an axle 52, the ends of these axles having rotatably disposed thereon sprocket gears 53. These sprocket gears 53 also comprise the usual type of vehicle wheels built up in a manner similar to the sprocket gears 44 and the rear vehicle wheels as per Figure 6. Connected to the bearing blocks 49 at 54, are the ends of screw threaded bolts 55, the same extending through screw threaded bolts 35, between the front ends of the rods 34 constituting the side elements 33 of the traction device. These bolts 33 are provided with operating handles 56, and it will of course be understood that by rotating the said bolts 55 the bearing blocks 49 will be moved obviously moving the axle 52 therewith for purposes hereinafter described, it being noted that the inward sliding movement of these bearing blocks is limited by said spacing blocks 57 between the rods 34 of the side frame members 33.

It will be clearly noted from a consideration of Figure 3 that the position of the motor vehicle axle 8 is at a point slightly beneath the axle 52 and two-piece axle 43 at opposite ends respectively, of the frame members 33 and in view of the spring connection 38 between the frame of the traction device, and the said cross bar 39 of the chassis bars 5, the traction device will be in a position relatively as shown in Figure 3, for positively engaging the traction drum 46 with the snow or ice surface. Trained over the front and rear sprocket wheels 53 and 44 respectively of the traction device, are sprocket chains 58, the same being engaged upon the bottom surface thereof with the said sprocket ring gears 21 upon the rear wheels of the motor vehicle for consequently effecting a positive drive to the said traction drum 46. These sprocket chains 58 are provided with spurs 59 which will effectively cooperate with the spurs 48 upon the drum 46 for increasing the traction.

In view of the above description, it is believed by me that the operation and advantages of a motor vehicle sleigh attachment of the type herein shown and described will be readily appreciated by those skilled in the art, and although I have herein shown and described my attachment as including specific structural elements, it is nevertheless to be understood that minor changes may be made therein, without departing from the spirit and scope of the invention as claimed.

Having thus described my invention, what I claim as new, and desire to secure by Letters-Patent is:—

A motor vehicle sleigh attachment comprising a frame, dirigible runners supporting the forward end thereof, a driving shaft journalled in the rear portion of the frame, a frame pivotally mounted upon the driving shaft, driven shafts journalled in the second mentioned frame and located one at each side of the driving shaft, traction belts trained around the driven shafts and operatively connected with the driving shafts, and a traction drum mounted upon the driven shafts, which is located at the rear of the driving shaft.

In testimony whereof I affix my signature.

WILLIAM CHESTER NASON.